(12) United States Patent
Segal

(10) Patent No.: US 9,631,390 B2
(45) Date of Patent: Apr. 25, 2017

(54) STORAGE STRUCTURES

(76) Inventor: Maurice Segal, Jerusalem (IL)

( * ) Notice: Subject to any disclaimer, the term of this patent is extended or adjusted under 35 U.S.C. 154(b) by 366 days.

(21) Appl. No.: 14/241,740

(22) PCT Filed: Aug. 30, 2012

(86) PCT No.: PCT/IB2012/054461
§ 371 (c)(1),
(2), (4) Date: Feb. 27, 2014

(87) PCT Pub. No.: WO2013/030781
PCT Pub. Date: Mar. 7, 2013

(65) Prior Publication Data
US 2014/0219751 A1 Aug. 7, 2014

(30) Foreign Application Priority Data

Aug. 31, 2011 (ZA) .................. 2011/06363

(51) Int. Cl.
*E04H 6/22* (2006.01)
*E04H 6/14* (2006.01)
(Continued)

(52) U.S. Cl.
CPC ............. *E04H 6/22* (2013.01); *B65G 1/04* (2013.01); *B65G 1/06* (2013.01); *E04H 6/14* (2013.01); *E04H 6/24* (2013.01)

(58) Field of Classification Search
CPC .... E04H 6/14; E04H 6/22; E04H 6/24; B65G 1/127

See application file for complete search history.

(56) References Cited

U.S. PATENT DOCUMENTS 3,104,019 A * 9/1963 Duff .................. E04H 6/20
414/232
4,768,914 A * 9/1988 Sing .................. E04H 6/22
198/300
(Continued)

FOREIGN PATENT DOCUMENTS

DE    WO 0104439 A1 * 1/2001  ............... E04H 6/22
DE       10008848 A1 * 8/2001  ............... E04H 6/22
(Continued)

OTHER PUBLICATIONS

Written Opinion.

*Primary Examiner* — Kaitlin Joerger
(74) *Attorney, Agent, or Firm* — Tarter Krinsky & Drogin LLP

(57) ABSTRACT

A storage structure (10) according to the invention comprises a plurality of pallets (14) that is each configured to carry a load such as a car (16), a vertical conveyor (12) including a number of endless chains (26), a support structure (24) that defines storage bays (18) in which the pallets (14) and cars (16) can be stored, a number of brackets (30) on each chain (26), and a sliding mechanism (44,46) on each level, for sliding the pallets (14) between the bays (18) and a position in which the pallet (14) is supported on some of the brackets (30) on the chains (26). The bays (18) are provided on opposing sides of the vertical conveyor (12) and are spaced apart vertically on multiple levels, with equal vertical spacing between the levels. The brackets (30) are spaced apart on the chains (26) by a distance equal to the spacing between the levels of bays (18).

4 Claims, 13 Drawing Sheets

(51) Int. Cl.
*E04H 6/24* (2006.01)
*B65G 1/04* (2006.01)
*B65G 1/06* (2006.01)

(56) References Cited

U.S. PATENT DOCUMENTS

| | | | | |
|---|---|---|---|---|
| 7,815,410 B2* | 10/2010 | Shinozuka | ................ | E04H 6/22 |
| | | | | 187/411 |
| 8,812,148 B2* | 8/2014 | Kharkover | .............. | E04H 6/225 |
| | | | | 414/227 |
| 2006/0018738 A1* | 1/2006 | Yen | ........................... | E04H 6/22 |
| | | | | 414/234 |
| 2006/0245859 A1* | 11/2006 | Frank | ........................ | E04H 6/14 |
| | | | | 414/277 |
| 2011/0268539 A1* | 11/2011 | Baik | ........................ | E04H 6/22 |
| | | | | 414/231 |

FOREIGN PATENT DOCUMENTS

| | | | | |
|---|---|---|---|---|
| GB | 949609 | 2/1964 | | |
| JP | WO 2011024883 A1 * | 3/2011 | .......... | B60L 11/1824 |
| KR | WO 2010076964 A2 * | 7/2010 | ............... | E04H 6/22 |

\* cited by examiner

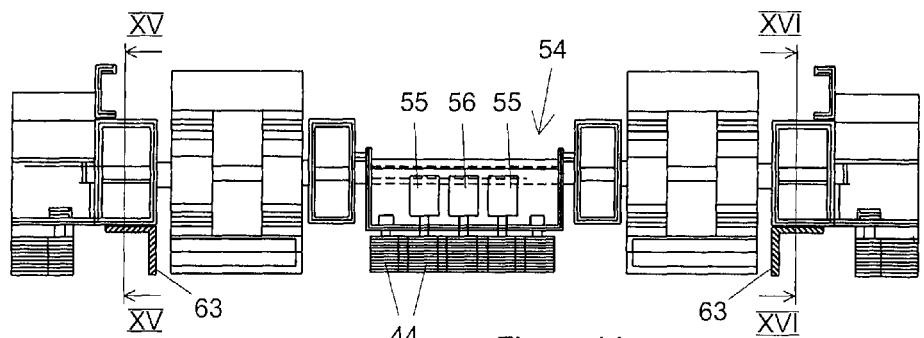
Figure 14
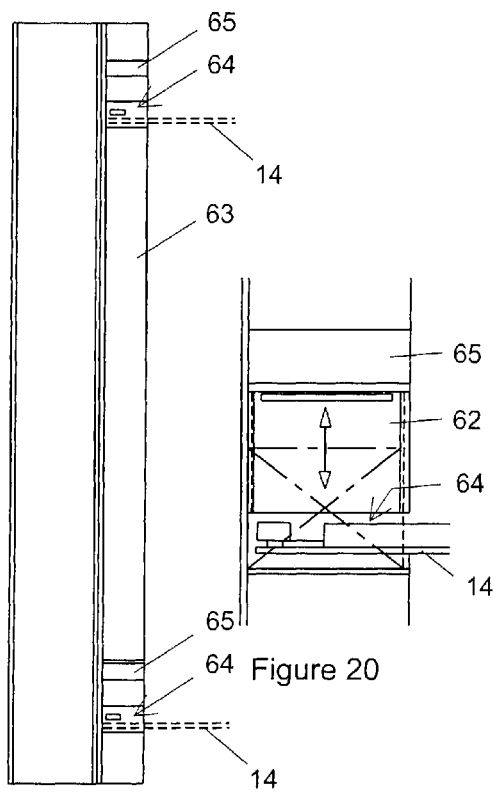
Figure 15
Figure 20
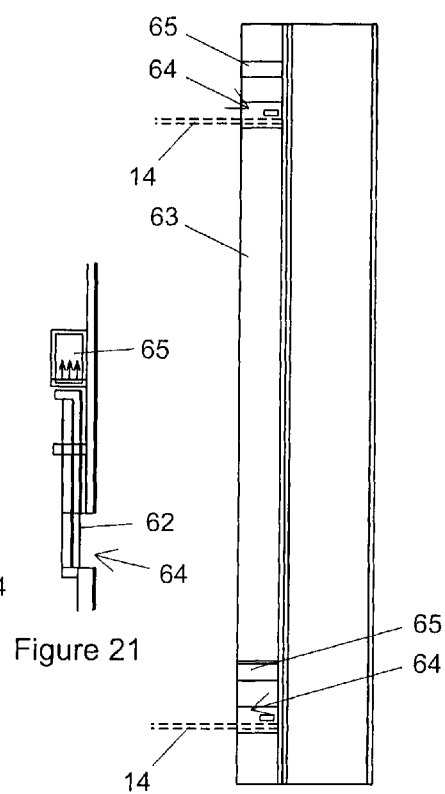
Figure 21
Figure 16

Figure 17
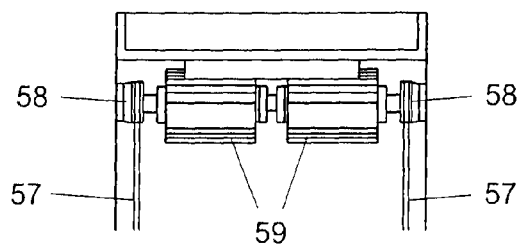
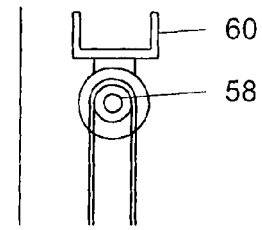
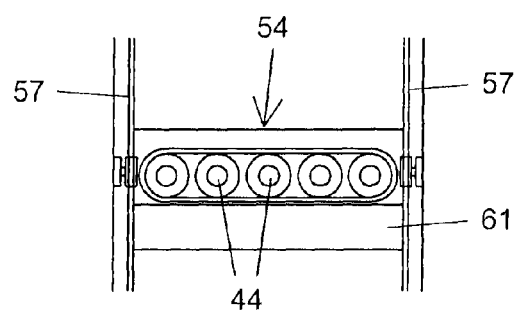
Figure 18
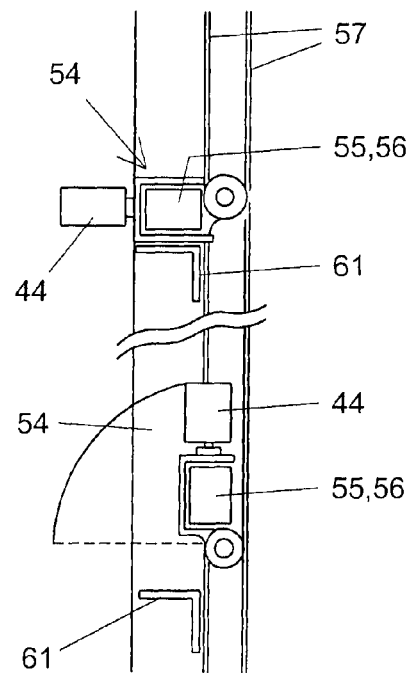
Figure 19

STORAGE STRUCTURES

FIELD OF THE INVENTION

This invention relates to storage structures—particularly, but not exclusively to storage structures in the form of active parking garages for motor vehicles.

BACKGROUND TO THE INVENTION

A commonly used storage structure for multiple vehicles where space is limited, is a conventional parking garage in which vehicles can travel up and down in a structure along ramps, to and from parking bays within the structure. The volumetric efficiency of these storage structures is quite low, because of the space required for the ramps, for turning circles of vehicles, for opening vehicle doors, etc.

Many attempts have been made to improve on the volumetric efficiency of ramp parking garages, using active parking garages where vehicles are mechanically moved within a storage structure to park and retrieve vehicles, rather than driving them to and from parking bays. Some of these active parking garages have found acceptance among users, but generally, they are perceived as being too slow in storing and retrieving vehicles and they are generally not used to their full capacity—especially during peak parking and retrieval times.

In most existing active parking garages, vehicles need to be transferred between different structures, e.g. from a receiving platform to a bogey or a lift or into a parking bay and these transfers are time consuming. Active parking garages have been built where vehicles travel on platforms and do not require transfers, in the form of Ferris wheel or paternoster types of parking. However, these systems are inefficient and so slow that even though hundreds have been built particularly in Japan, they have never achieved fast parking. Some were built in the USA but today not one remains.

The present invention seeks to provide an active storage system that requires about half the space of a ramp parking garage of similar capacity. The invention further seeks to store and retrieve vehicles efficiently, preferably so efficiently that the active storage system will be used to capacity during peak parking time and peak retrieval time.

SUMMARY OF THE INVENTION

According to one aspect of the present invention there is provided a storage structure, said storage structure comprising:

a plurality of support elements, each configured to carry a load;

a vertical conveyor including a plurality of continuous tensile elements;

a support structure which defines a plurality of bays in which said support elements can be supported, said bays being spaced apart vertically on multiple levels, with equal vertical spacing between said levels, and said bays being defined on opposing sides of the vertical conveyor;

a plurality of brackets on each tensile element, said brackets being spaced apart by a distance equal to the spacing between the levels of bays; and a sliding mechanism on each of said levels, for sliding one of said support elements between at least one of said bays and a position in which the support element is supported on a plurality of the brackets on the tensile elements.

The support elements may be in the form of pallets or platforms and they may be configured to carry loads in the forms of vehicles.

The vertical conveyor may include continuous tensile elements in the form of chains, e.g. the vertical conveyor may include four pairs of pulleys with endless chain drives, with the brackets attached to each of said chains.

The support structure may define single bays on each of the opposing sides of the vertical conveyor. This arrangement would be exceptionally fast but the volume of the storage structure, per bay would be much greater (i.e. the storage density of the structure lower) than an arrangement in which the support structure defines an inner and an outer bay on each side of the vertical conveyor, on each level.

The storage structure may include a rotatable frame that is configured to support two of said support elements, in the inner bay and outer bay, respectively, and the frame may be rotatable to invert the positions of the support elements between the inner bay and outer bay.

The storage structure may include at least one stack of said support elements, said stack being configured to receive a load on the top of the uppermost support element in the stack, before sliding said support element to the vertical conveyor, or to receive a loaded support element from the vertical conveyor, on top of the stack. Two of said stacks of support elements may be provided on opposing sides of the vertical conveyor and the total number of support elements may equal the number of bays in the storage structure. The stack of support elements may be configured to be raised or lowered to align the uppermost support element in the stack with brackets on the continuous tensile elements.

According to another aspect of the present invention, there is provided a method of storing loads, said method comprising:

receiving one of said loads on a support element;

sliding said loaded support element to a position in which the support element is supported on a plurality of brackets, each of which is connected to a continuous tensile element of a vertical conveyor;

moving the loaded support element in the vertical conveyor along the tensile elements, to a predetermined level;

sliding the loaded support element from the vertical conveyor to a bay defined in a support structure, said support structure defining a plurality of said bays in which the support element can be supported, said bays being spaced apart vertically on multiple levels, with equal vertical pacing between said levels, and said bays being defined on opposing sides of the vertical conveyor;

retrieving the loaded support element by sliding it from said bay to the vertical conveyor, supporting the support element on brackets attached to the endless tensile elements of the vertical conveyor, moving the loaded support element in the vertical conveyor and sliding it from the vertical conveyor;

wherein the brackets on each tensile element are spaced apart by a distance equal to the spacing between the levels of bays.

The method may include moving a plurality of said support elements in the vertical conveyor simultaneously, with the vertical spacing between the support elements equaling a number of the vertical spacing between levels of bays. (The term "number" refers to "counting numbers", i.e. any whole number larger than zero—and it thus refers to spacing that are equal to the spacing between levels of bays and/or equal to multiples of the spacing between levels of bays.)

The support elements may be pallets and the loads may be vehicles that are received on the support elements and/or are retrieved from the support elements on an entrance/exit level.

While the support element is being moved in the vertical conveyor, brackets attached to the inactive side of each endless tensile element may be moved in an inverted state.

BRIEF DESCRIPTION OF THE DRAWINGS

For a better understanding of the present invention, and to show how the same may be carried into effect, the invention will now be described by way of non-limiting example, with reference to the accompanying drawings in which:

FIG. 14 is a detail plan view of a vertical conveyor of a parking garage according to any one of FIGS. 1 to 7;

FIGS. 15 and 16 are details sections of the vertical conveyor of FIG. 14, taken at XV-XV and XVI-XVI, respectively;

FIG. 17 is a detail elevation of motors and chains at the top of the vertical conveyor of FIG. 14;

FIG. 18 is a detail elevation of a pivoting transfer unit of the vertical conveyor of FIG. 14;

FIG. 19 is a diagrammatic section showing support of the transfer unit of FIG. 18 by the motors and chains of FIG. 17, at different elevations and in different positions;

FIG. 20 is a diagrammatic elevation of an electromagnetic gate of the vertical conveyor of FIG. 14;

FIG. 21 is a diagrammatic section of the electromagnetic gate of FIG. 20; and

DETAILED DESCRIPTION OF THE DRAWINGS

Figure 1:
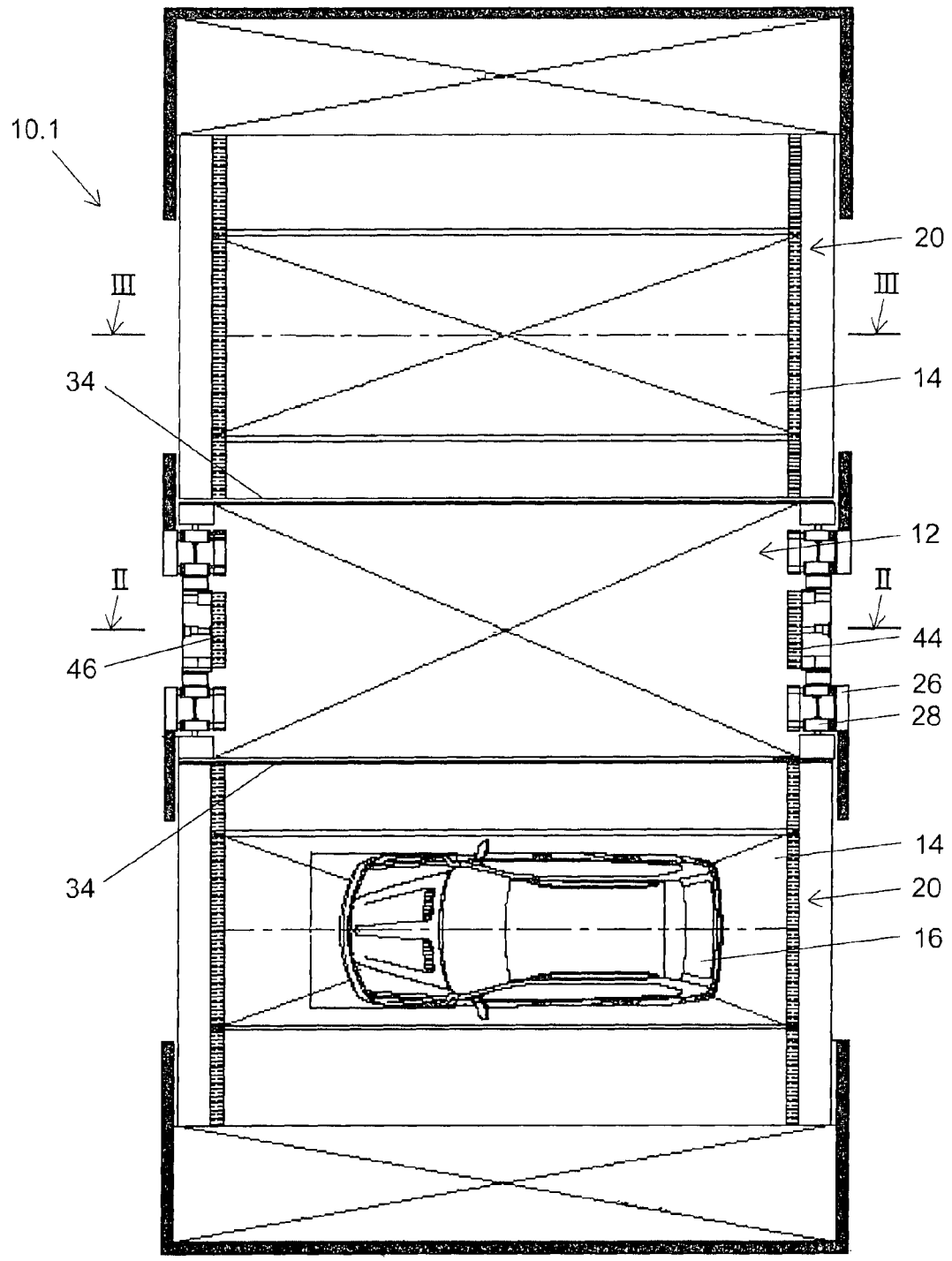
FIG. 1 is a diagrammatic plan view of the entry and exit level of a first embodiment of a storage structure according to the present invention, in the form of a vehicle parking garage with two parking bays per level—one on each side of a vertical conveyor.
Figure 2:
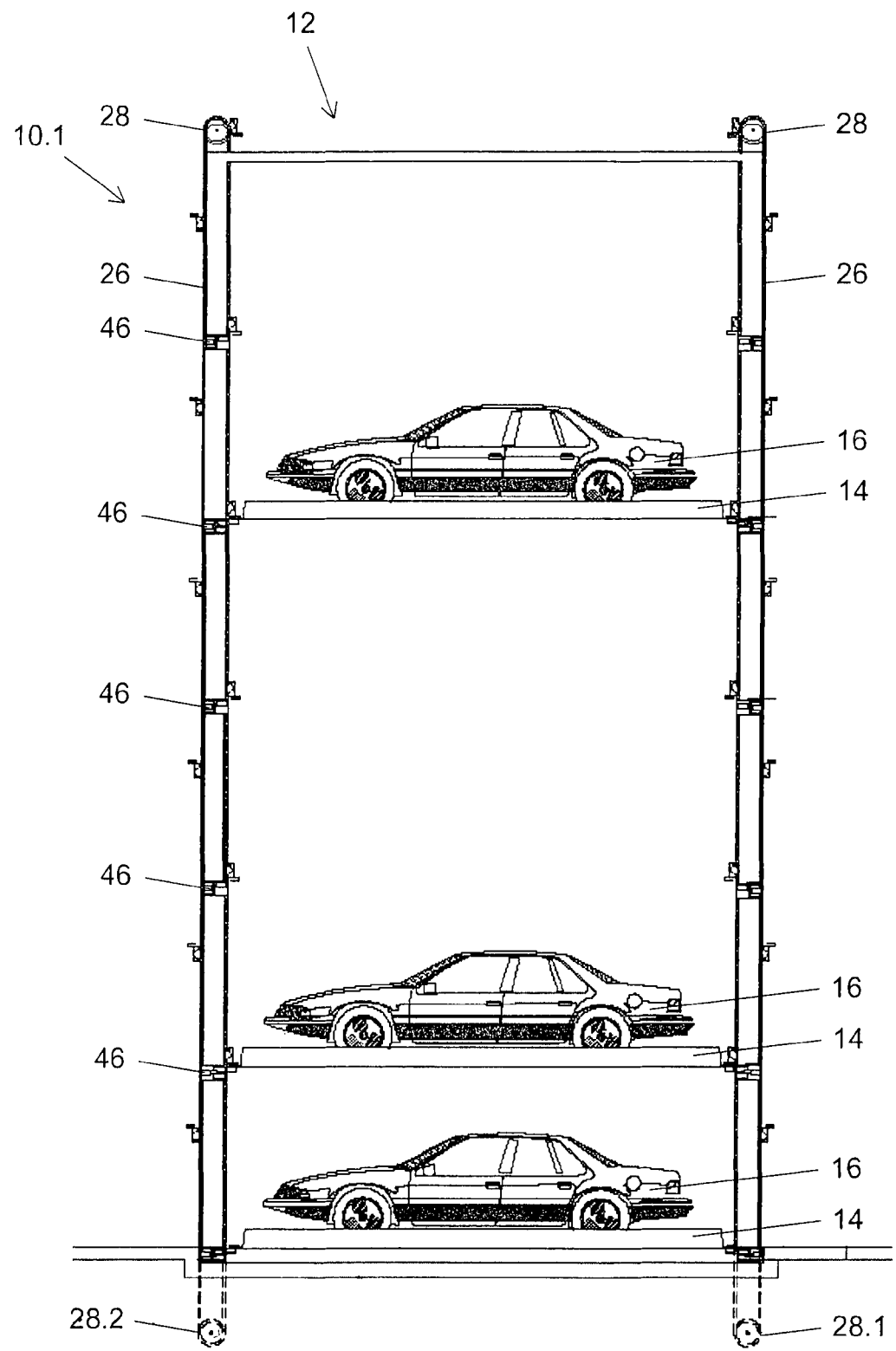
FIG. 2 is a vertical section through a vertical conveyor of the parking garage of FIG. 1, taken at II-II.
Figure 3:
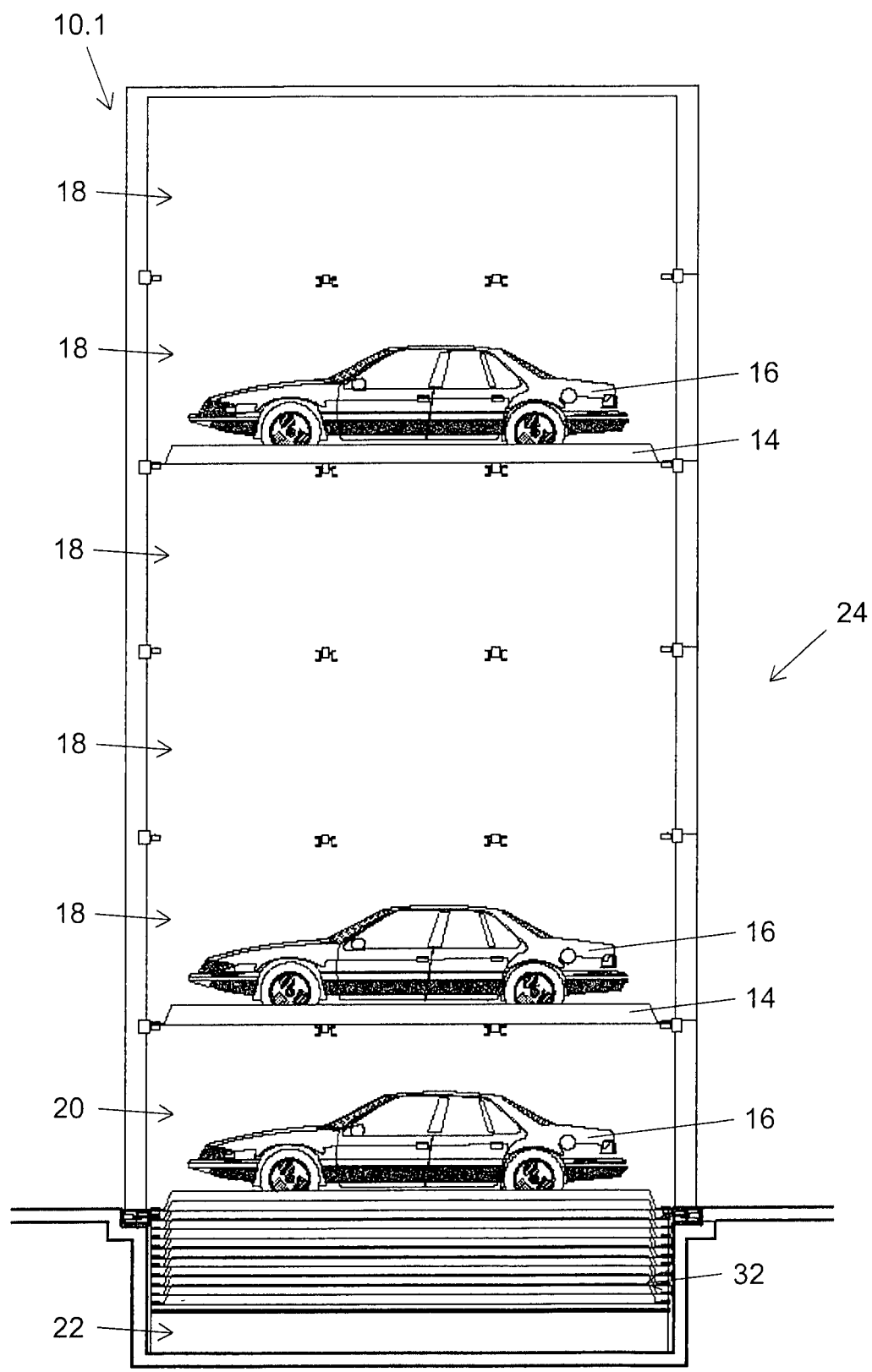
FIG. 3 is a vertical section through an entrance/exit and parking bays of the parking garage of FIG. 1, taken at III-III.

Referring to the drawings, a storage structure in the form of a vehicle parking garage in accordance with the present invention is generally indicated by reference numeral 10, with a suffix referring to the number of each particular embodiment of the storage structure. Features that are common between different embodiments of parking garages 10 in accordance with the invention, are indicated by like reference numerals.

Referring firstly to FIGS. 1 to 3, 8 and 9, the first embodiment of a vehicle parking garage 10.1 consists of a central rectangular area which houses a vertical conveyor 12 with which support elements in the form of pallets 14 bearing loads in the form of vehicles 16 are raised from an entry and exit level to parking bays 18 or lowered from the parking bays to entry/exit level. On either side of the central vertical conveyor 12 are rectangular entry/exit spaces 20 which include sunken areas or pits 22 below them for stacking pallets 14. The pits 22 accommodate the same number of pallets 14 as there are parking bays 18 in the levels of the storage structure 24 above. The storage structure 24 is a perfect rectangle so that similar structures can be added to the ends or sides.

In the four corners of the central vertical conveyor space are continuous tensile elements in the forms of chain drives 26 which are supported by circular pulleys 28 which rotate above the parking levels and below ground level. There are twin pulleys 28 on each corner with a central rod which links the twin pulleys on that side. The pulleys 28.1 on the entrance side are joined underground by chains (not shown) which are attached to the motors and pulleys 28.2 on the exit side so that they will rotate as a mirror image of the pulleys on the entrance side, thus ensuring that the runs of the chains 26 facing inwardly in the vertical conveyor 12 move in unison and pallets 14 connected to these runs of the chains are lifted or lowered horizontally. It will be understood that the chains 26 can be driven in either direction.

Brackets 30 are attached to each of the chain drives 26 through bolts that assure that they will pass over and under the pulleys 28 and travel inverted on the inactive side of the chain—i.e. the runs of the chains facing outwardly. The spacing between the brackets 30 on each chain 26 is equal to the spacing between the parking levels of parking bays 18 in the storage structure 24.

The pallets 14 are stored one above the other in stacks 32 in the pits 22 on either side of the vertical conveyor 12. A standard four post or an alternative vehicle lift (not shown) under the stack 32 of stored pallets raises or lowers all of them so that the load surface of the uppermost pallet 14 in the stack is at ground level in the entry/exit spaces 20, so that when a vehicle 16 arrives the driver will drive onto the uppermost pallet in the stack 32 and a light metal fast action shutter 34 will roll down to separate the driver from any moving machinery. When the driver is safely out of the parking garage 10, the shutter 34 will roll up.

Various embodiments of the brackets 30 and the pallets 14 are possible, but some preferred embodiments are shown in FIGS. 8 to 11. The pallet 14 is of steel sheet bent as shown with three or five V-shaped ridges 43 for strength. It has spot welded flat steel ends 41 with at least two flat circular runners 38 at each end to steady the pallet as it moves between side rails of the bracket 30.

Figure 12:
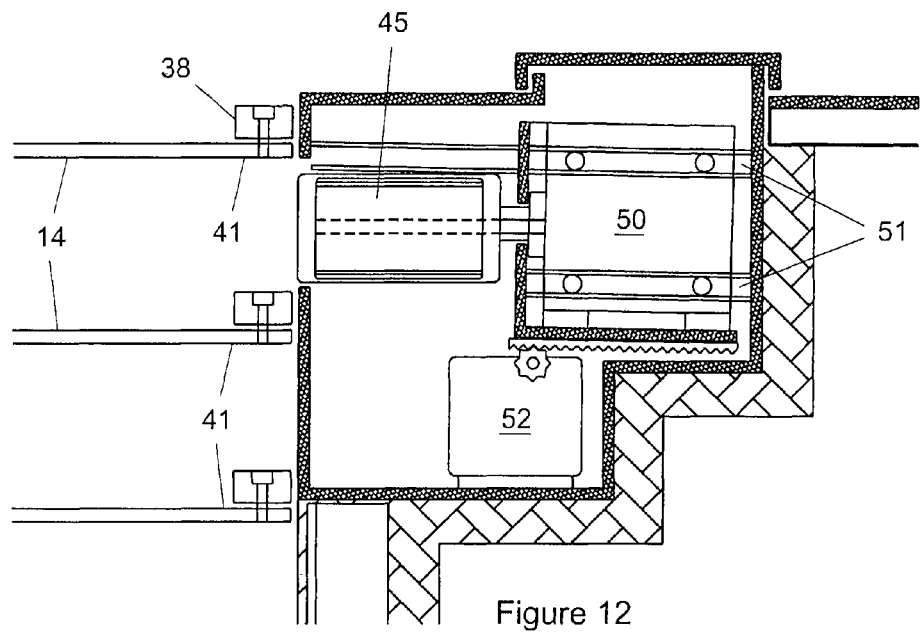
FIGS. 12 and 13 are sectional views through retractable rollers in a vertical conveyor of a parking garage according to any one of FIGS. 1 to 7, in retracted and extended conditions, respectively.
Figure 13:
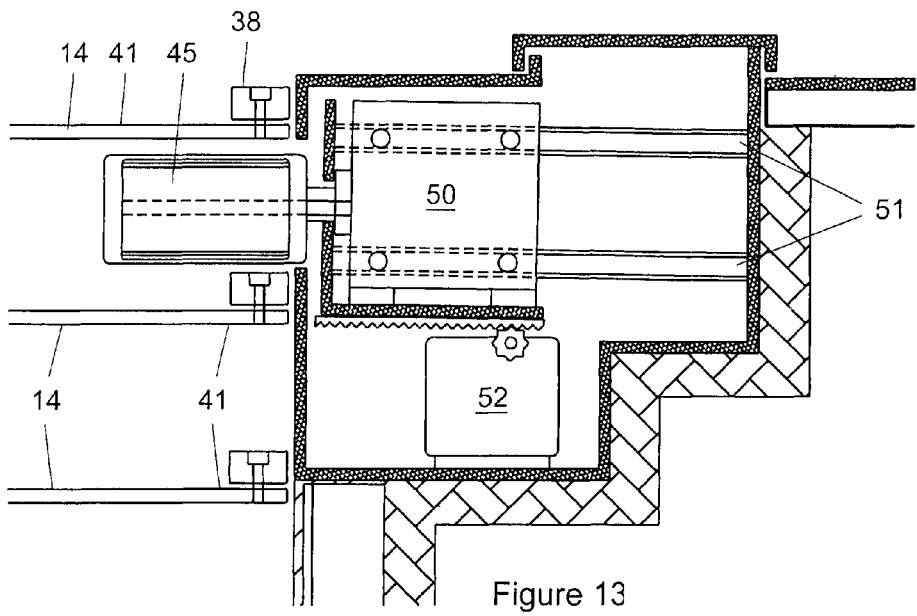

FIGS. 12 and 13 show sections of a number of rollers 45, which carry flexible belts and which are configured to carry the ends 41 of the pallets 14 at the entry spaces 20. The rollers 45 are driven by small motors 50 when the rollers are received under the ends 41 of a pallet 14. The rollers 45 are mounted on side slides 51 and are driven by separate motors 52 via rack-and-pinion sets 53 to slide the motors 50 and rollers 45 between retracted positions shown in FIG. 12 and extended positions in FIG. 13. In the extended position, the rollers 45 can move a pallet 14 that rests on the rollers, horizontally, and in the retracted position, the pallets can move past the rollers, vertically. The side slides 51 are set at a very slight angle so that when they are extended they not only make contact with the undersides of the pallets 14 but also lift them slightly.

The motors 50 rotate the rollers 45 and their belts under the pallet 14 to move the pallet sideways so that that the flat edge 41 of the pallet and its two runners 38—which are designed to guide the pallets on the parking levels, will enter a compartment 40 in the bracket 30. Rollers 36 in the bracket 30 will support the weight of the pallet 14 as it enters compartment 40. The bracket 30 defines a slot 42 through which the pallet 14 extends as its end 41 and runners 38 are received inside the compartment 40. The movable rollers 45 and motors 50 are below entry level and are covered and protected by metal plates or grilles so that arriving and departing vehicles 15 may run over them. Rollers 46 and their flexible belts outside the vertical conveyor 12 on all upper levels, remain in position and are rotated by small motors.

The pallet 14 that enters the bracket 30 is further moved into position in the center of the vertical conveyor 12 between each pair of the chain drive 26 by a pivoting transfer unit 54 with five rollers 44 which are served by two small motors 55 and a central brake 56. Each transfer unit 54 is positioned between inner vertical columns of the vertical conveyor 12 and retracts by swinging upwards from a horizontal position when the pallets 14 are ascending or descending in the vertical conveyor.

There are transfer units 54 on opposing sides of the vertical conveyor 12 at every parking level and each transfer unit 54 is attached to loops of two chains 57 on pulleys 58 driven by two motors 59 secured to a U-beam 60 welded to two inner columns on the topmost parking level. The spacing of the attachment of the transfer units 54 to the chains 57 is equal to the spacing between the parking levels.

When the pallet 14 stops at a parking level the transfer unit 54 rotates from a vertical position to a horizontal position and rests its motors 55 on a L-shaped steel beam 61 with its flexible belts ready to rotate to help move pallets from the vertical conveyor 12 to parking bays 18 or from parking bays to the vertical conveyor.

Pallets which are moved into or out of the vertical conveyor 12 have to pass through small guillotine-like gates 62. L-shaped curbs 63 are welded to outer columns of the vertical conveyor 12 and each curb 63 has a flange that defines the slots 64 at each level, from the ground to the top parking level, where a pallet 14 may need to be moved horizontally. Each gate 62 is controlled by an electromagnet 65 set into the curb 63, which raises the small, but heavy metal gate 62 to allow the pallet 14 to pass through the slot 64 and the bracket 30 and stop in the center of the vertical conveyor, held by four brackets on the four corners of the pallet. Once the pallet 14 is in such a centre position, the electromagnets 65 release the gates 62 to close the slots 64.

Cars 16 can move out of the vertical conveyor 12 when the gates 62 on either side are opened so that the pallet 14 can move to one side or the other, but while the vertical conveyor is operating, all curb gates are closed. These movements can happen at every level simultaneously.

The four brackets 30 are motionless at entrance/exit level when the front and rear ends of a vehicle bearing pallet 14 slide into the grips of the four corner brackets. The vehicle bearing pallet 14 can then be raised to the first parking level 18.

A pair of angled supporting rollers span from beams on either side of the vertical conveyor space to the outside walls. These beams are to strengthen the structure 24 and to help support the vehicle bearing pallets in the event of an earthquake.

A pallets 14 firmly held in the vertical conveyor 12 on its corners by the four brackets 30 is raised as the pulleys 28 rotate and the chain drives 26 travel as fast as acceleration and deceleration allows until the pallet is level with the first parking level 18.

Meanwhile the safety shutter 34 has descended, the vehicle lift had raised the top pallet 14 in the stack 32 to the entrance level and a second driver steers his vehicle onto a second pallet. The actions of the first pallet 14 as described above are now repeated.

Mention has not yet been made of transferring the vehicles 16 which have been carried upwards in the vertical conveyor 12 and are level with parking bays 18. The reason for postponing these transfers is to save time. The power required to activate rollers that move the vehicles 16 sideways is so small that it is worth moving five or ten vehicles simultaneously. These rollers 46 at the nose and tail ends of the vehicle bearing pallets 14 and are arranged in rows encircled by flexible belts. Small motors and brakes control the activating and stopping of the rollers 46.

The vehicles 16 are driven onto the pallets 14 at entrance level and remain on the same pallet throughout the vertical travel, the parking in the bay 18 on the upper level, the retrieval and the vertical travel down and the arrival at the entry/exit where the owner of the vehicle drives it off. Accordingly, there is no transfer of a vehicle 16 from onto or off the pallet 14.

All horizontal movements of pallets 14 without exception, are sideways movements from entry to vertical travel; from vertical travel to upper parking bays 18; from upper parking bays to vertical travel and finally from arrival at ground level to the exit.

Figure 4:
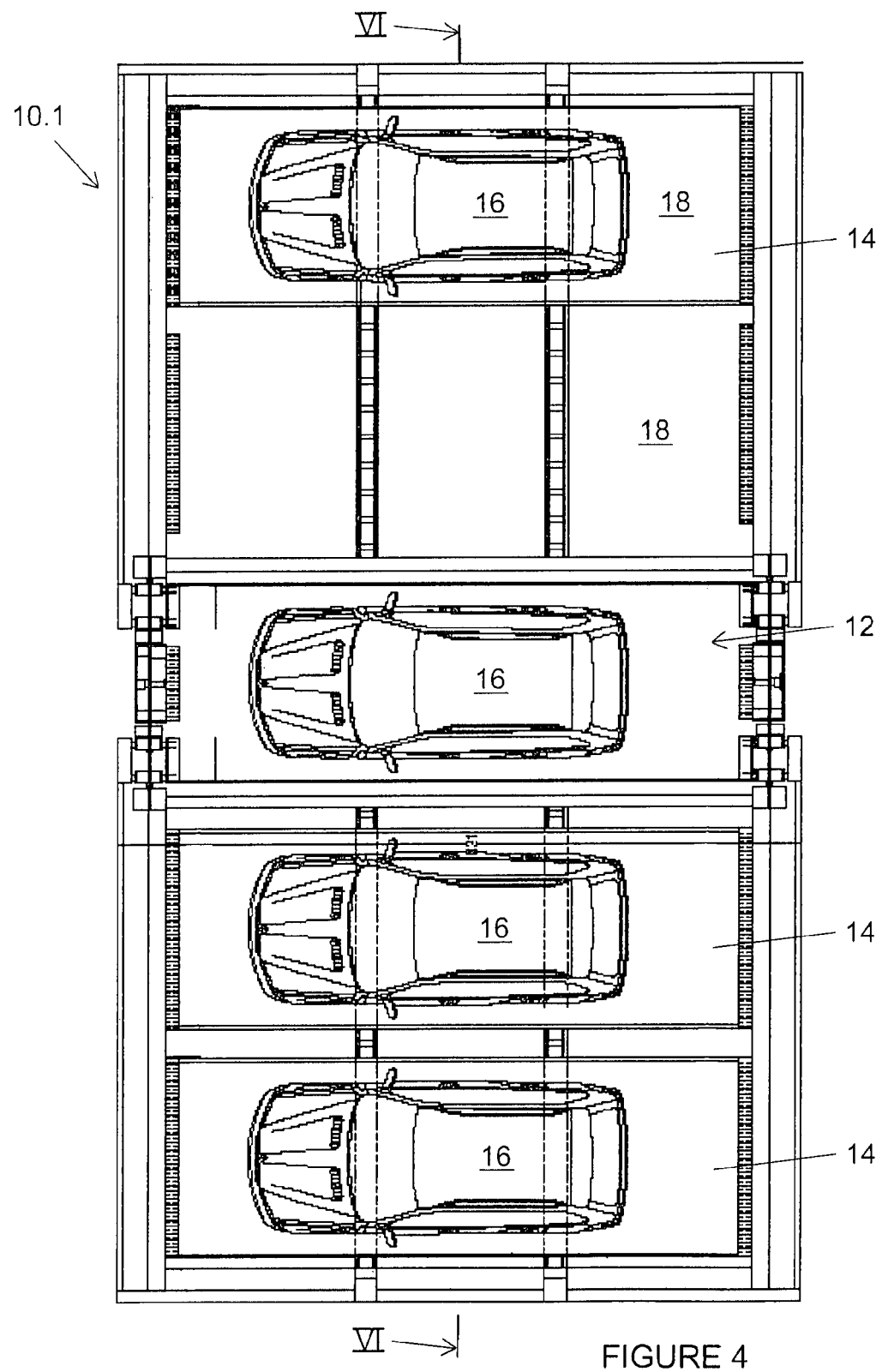
FIG. 4 is a plan view of a level of parking bays in a second embodiment of a storage structure according to the present invention, in the form of a vehicle parking garage with four parking bays per level—two on each side of a vertical conveyor.
Figure 5:
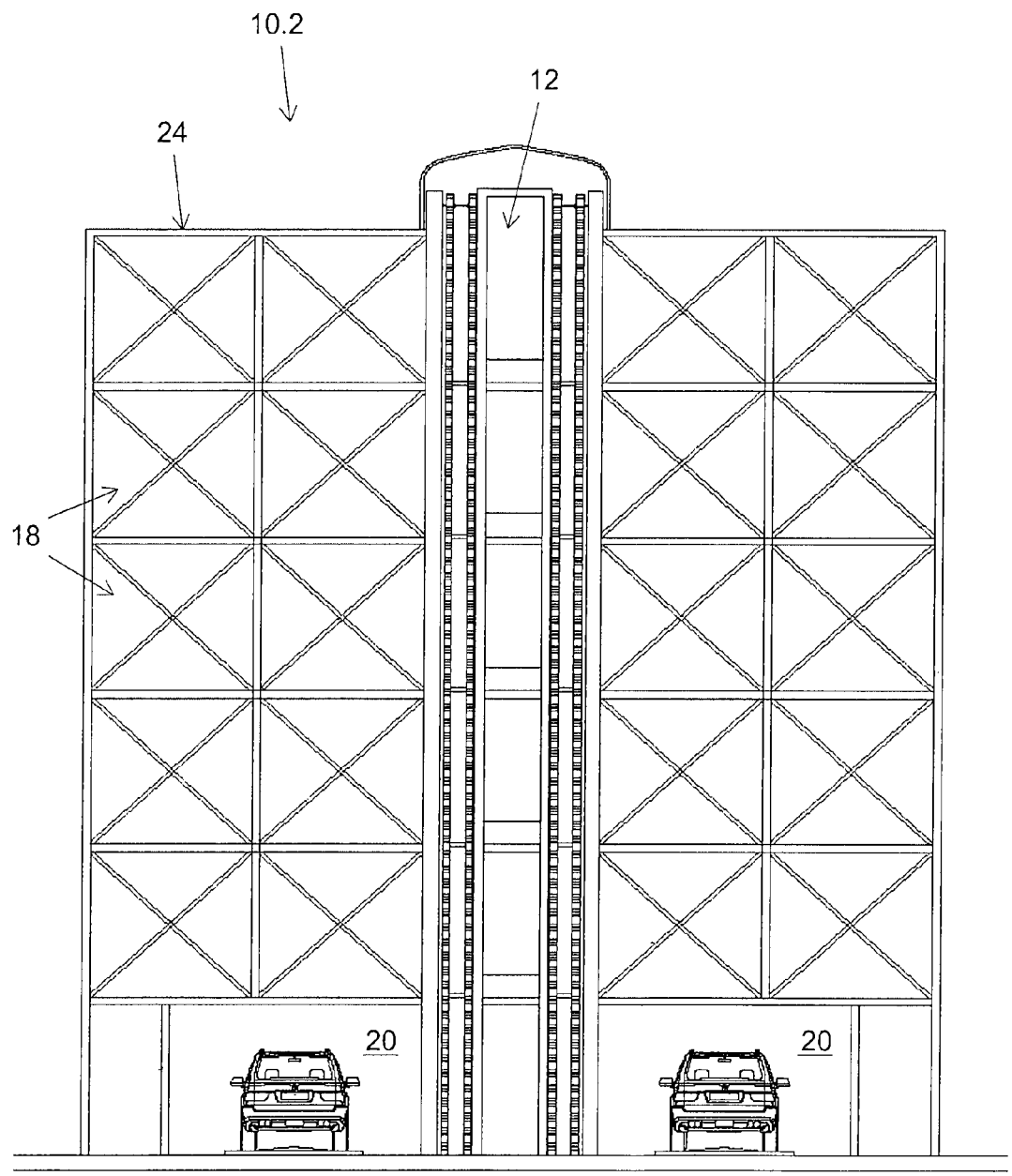
FIG. 5 is an elevation of an entrance side of the parking garage of FIG. 4—an opposing exit side of the parking garage is identical.
Figure 6:
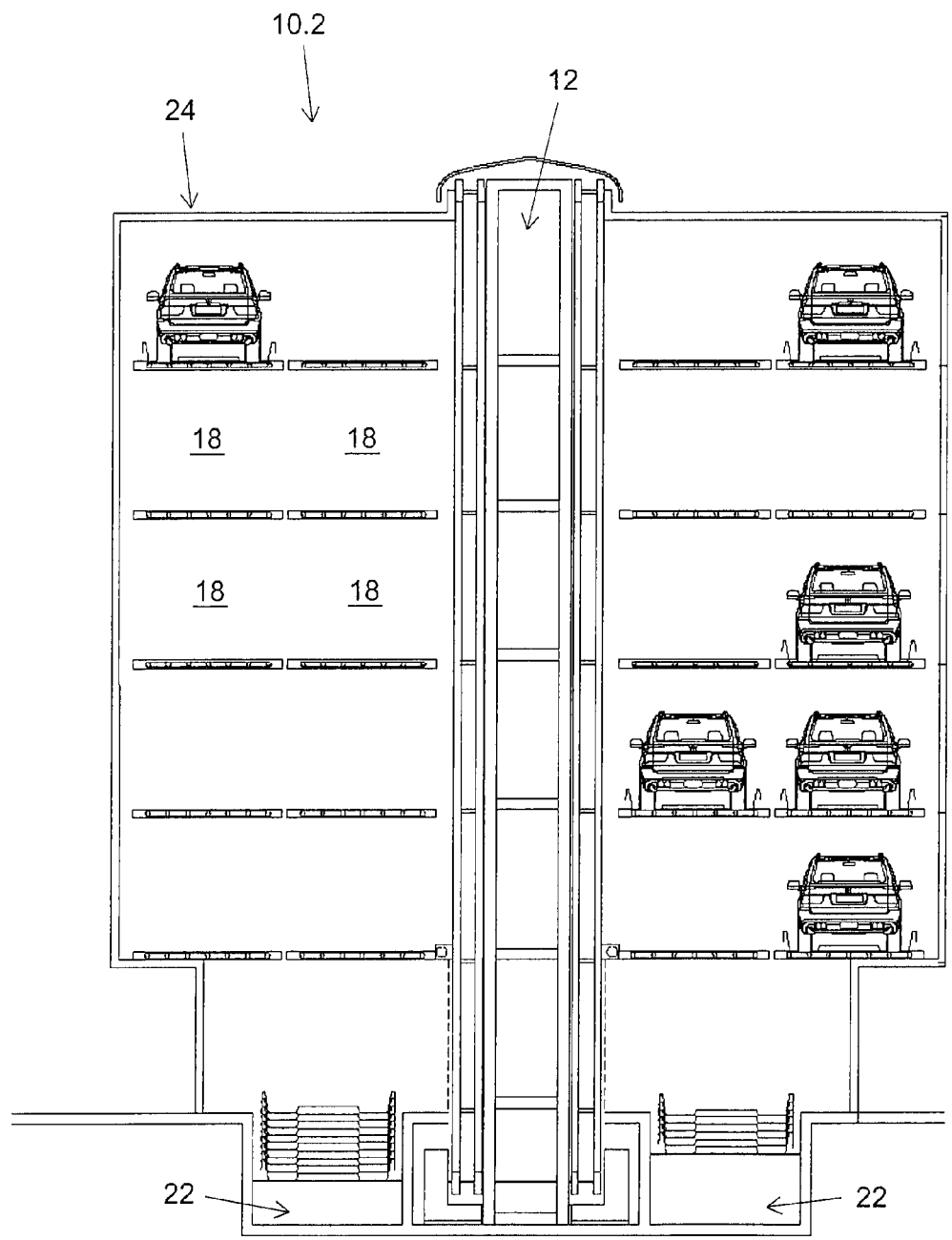
FIG. 6 is a vertical section of the parking garage of FIG. 4, taken at VI-VI.

Referring to FIGS. 4 to 6, in a second embodiment of a parking garage 10.2 in accordance with the invention, all the features are generally as described above with reference to FIGS. 1 to 3 (and are not all marked with reference numerals in FIGS. 4 to 6), but instead of a single parking bay 18 on each side of the vertical conveyor 12 on each level in the storage structure 24, there are two parking bays on each of the opposing sides of the vertical conveyor—an inner parking bay immediately adjacent the vertical conveyor and an outer parking bay. The pallets 14 can slide sideways between the inner and outer parking bays 18 in much the same way that they can slide between the vertical conveyor 14 and the inner parking bays, with the aid of an array of powered rollers.

As an example: When the vehicle bearing pallets 14 in a ten level parking garage 10.2 are all positioned in the center of the vertical conveyor 12, the ten vehicle bearing pallets can be moved simultaneously to the outside parking bays 18, leaving the vertical conveyor space clear to repeat the parking of another ten vehicles on the inner parking bays. Thus 20 vehicles can be parked on one side of the storage structure 24 very quickly.

Likewise the first batch of 10 vehicles 16 on the second side of a ten parking level structure 24 may also remain in the vertical conveyor 12 and then moved simultaneously to the outer parking bays 18 and the next batch of ten vehicles may be moved to the inner parking bays in the same way.

The problems of retrieving the vehicles 16 from the storage structure 24 will start more slowly than parking them but will rapidly reach a level of delivering vehicles as quickly as people arrive.

Assuming a ten level storage structure 24: the pallet supporting brackets 30 will be immediately available at all levels to vehicles 16 on both sides of the vertical conveyor 12. If all the parking bays 18 are occupied, half the vehicles 16 will be on the inside parking bays and half on the outside. Half the drivers of these vehicles will have vehicles on the inside bays 18 and half on the outside bays. The first vehicles 16 that can be moved to the vertical conveyor 12 from either side of the storage structure 24 have to be owned by drivers of the vehicles in the inside bays 18 and those drivers with vehicles in outside bays will have to wait a matter of minutes until their vehicles are retrieved. As soon as there are a few gaps among the inside parking bays 18, vehicles 16 can be released from the outer bays directly to the vertical conveyor or any "obstructing" vehicles on the inner parking bays can be moved into the nearest available parking bay on either side of the storage structure 24. At the beginning this will usually involve moving the obstructing vehicle 16 upwards temporarily into a parking bay 18 on either side of the structure 24, but as the process continues it will accelerate so that, especially on a busy day, within 5 to 10 minutes there will be very little waiting time.

A great percentage of existing vehicle parking systems depend on double depth parking served by individual elevators, but the time taken to reposition vehicles by individual elevators is very much greater than the system of the present invention, where the vertical conveyor 12 is ready to accept a pallet 14 at every level.

The present invention shows vehicles 16 entering and exiting from the same entry/exit space 20 which is more than twice the width of a vehicle so a family with an invalid with suitcases and a dog won't have a problem entering and departing. The structure 24 is slightly wider than the length of a single pallet 14 so most lots will have sufficient space for drivers to enter and exit without turntables. If this is not possible turntables can be positioned on the entry side.

Mention should be made of a ticket dispenser or electronic vehicle number sensor which offers a ticket or disc for the driver to accept before a single boom is raised to allow drivers to enter. There should also be sensors which will not allow entry of vehicles that are too long or too high.

Figure 7:
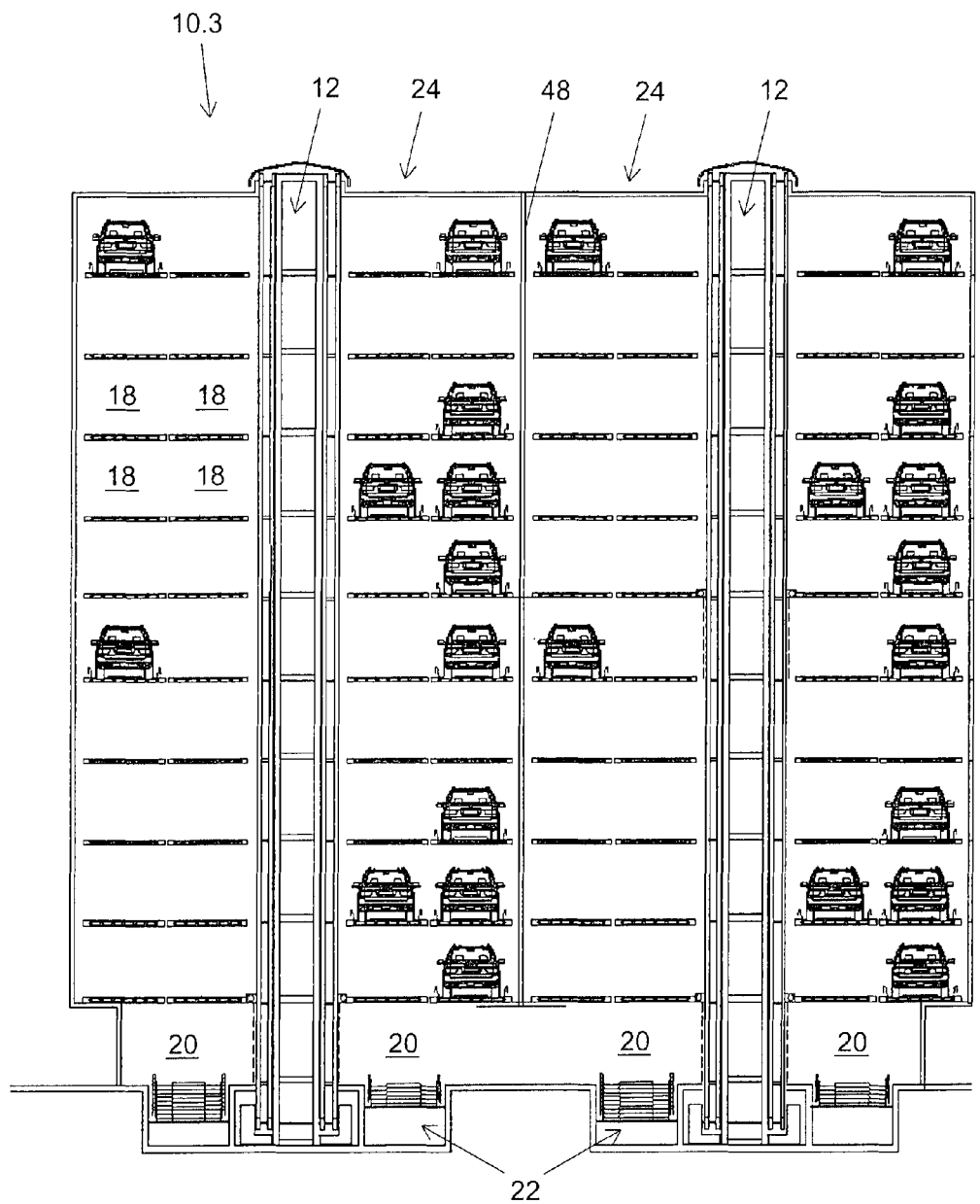
FIG. 7 is a vertical section through a third embodiment of a storage structure according to the present invention, in the form of two of the parking garages of FIG. 4 in a side-by-side arrangement, sharing a common wall.
Figure 8:
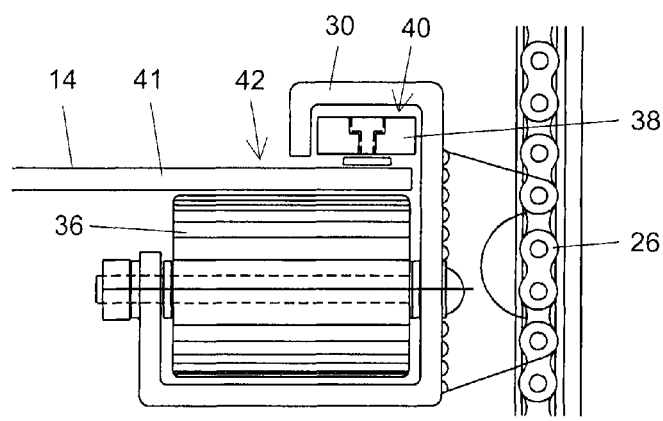
FIG. 8 is sectional view of one corner of a pallet entering a bracket of a vertical conveyor of a parking garage according to any one of FIGS. 1 to 7.
Figure 9:
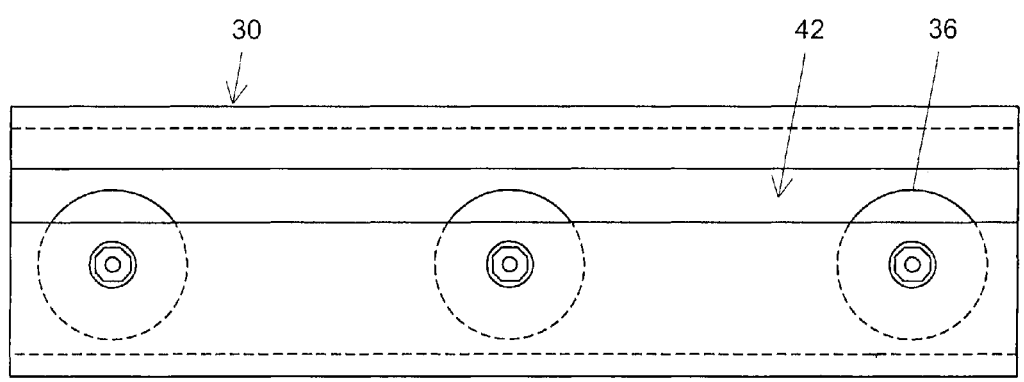
FIG. 9 is a side elevation of a bracket of a vertical conveyor of a parking garage according to any one of FIGS. 1 to 7.
Figure 10:
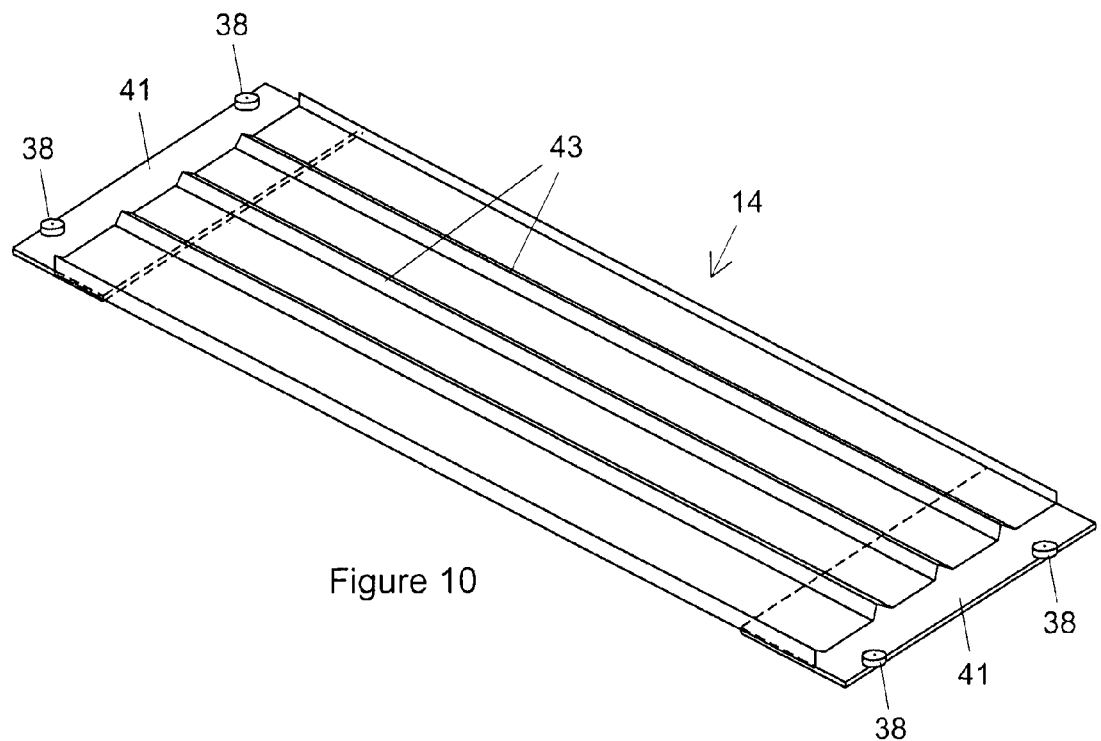
FIG. 10 is a three dimensional view of a pallet of a parking garage according to any one of FIGS. 1 to 7.
Figure 11:
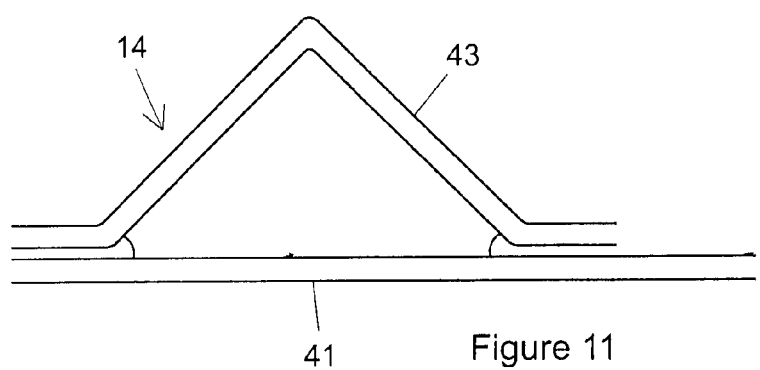
FIG. 11 is a detail section through the pallet of FIG. 10.

FIG. 7 shows two structures 24 joined together by a single common wall 48 or without any physical division between them. It should be clear that any number of structures 24 can be joined together in this way. Thus five structures 24 ten parking levels high and 60 meters long would accommodate 200 vehicles and if it was designed and built of two back to back structures it will be 13 meters deep parking 400 vehicles with 10 entry exits. This would not only be an efficient system, much faster than any existing but could also be a very valuable storage facility that could temporarily accommodate new vehicles near a vehicle production plant or a delivery area near ports and protect the vehicles stored in it from snow, sun, tornadoes and floods and save large areas of land reserved for ground level parking.

The invention can park and retrieve cars within the same time period when it is operated as a storage structure. When it is operated as an automated parking garage with a throughput of arriving and departing cars departures will take longer than arrivals mainly because a percentage of cars on the outside parking places will be blocked by cars on the inside places which will have to move onto the centre vertical conveyor and make room for the cars on the outside places. This process will become faster as the number of departing cars decreases but is a problem which affects all parking systems with double parking.

Figure 22:
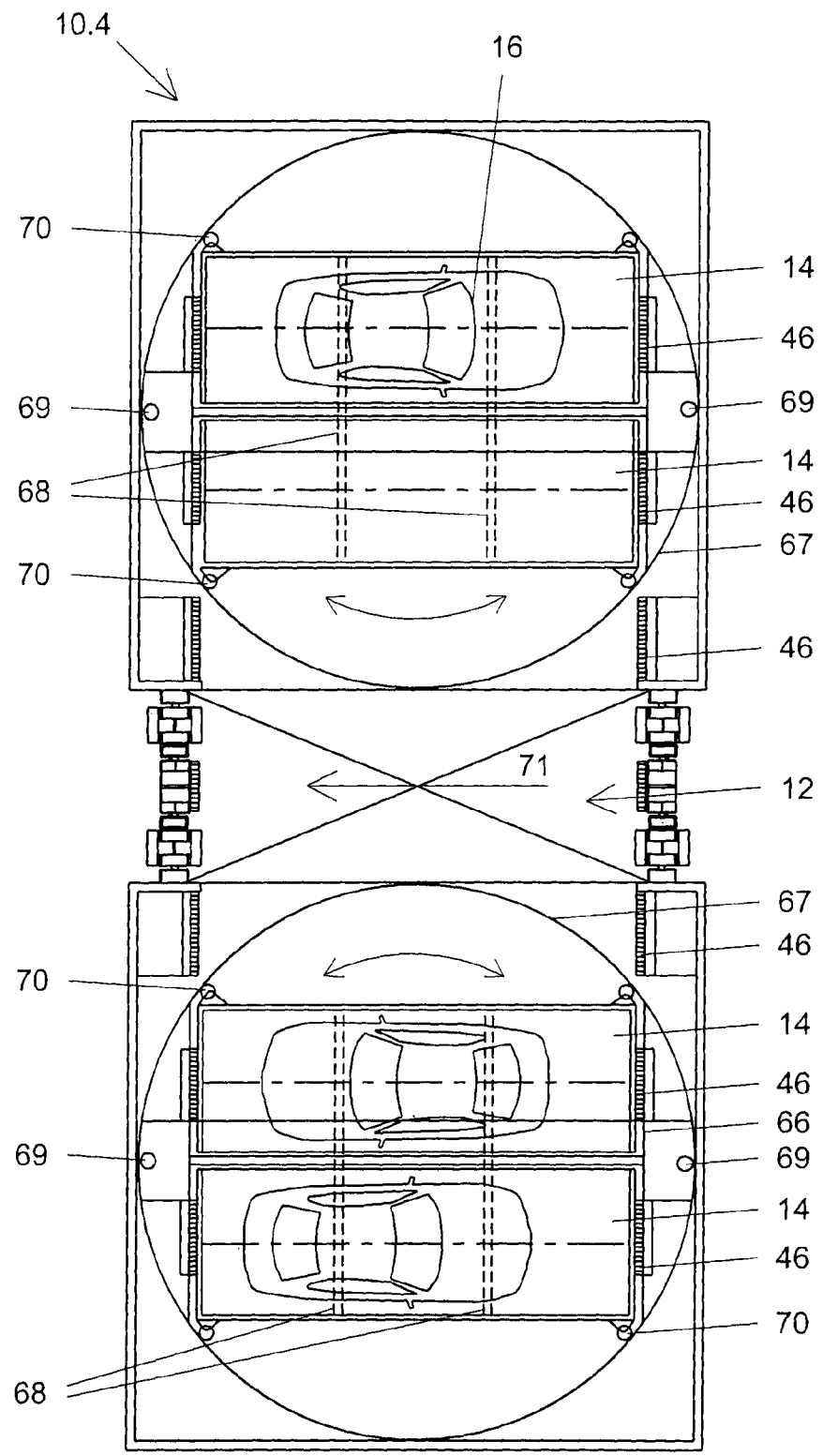
FIG. 22 is a plan view of a level of parking bays in a fourth embodiment of a storage structure according to the present invention—similar to that shown in FIG. 4, but with turntables on each side of the vertical conveyor.

Referring to FIG. 22, an alternative embodiment of the present invention is shown, which is similar to that shown in FIG. 4 in many respects, but the parking garage 10.4 is about 30% larger in size and includes a rectangular frame 66 on each side of the vertical conveyor 12, on each parking level, that can carry two pallets 14 and can rotate on a circular rail 67 on four wheels 70 fixed to the corners of the frame and angled to fit the curve of the circle. The frame 66 runs on wheels 70 attached to it's corners, below the height of the pallets 14. The frames 66 are rotated by toothed discs or wheels, driven by motors 69 that are sunk below the parking level. The pallets 14 rest on the frame 66 but are supported on each end by motor-driven rollers 46 and belts which move the pallets 14 and cars 16 sideways onto and off the frame 66.

The frame 66 is divided into two rectangular frames by two longitudinal beams which are close to each other near the center. Each of the two rectangular frames is divided into three by two cross beams 68. Both ends of the two frames support motors which rotate rollers 46 carrying flexible (timing) belts, which transfer two pallets 14 supporting cars 16, moving sideways onto and off the frames. At no time are the pallets 14 in contact with the metal frame 66, itself.

The belts on the rollers 46 of the rectangular frame 66 are parallel and are in line with the ends 41 of the pallets 14 when the pallet moves onto or off the frame. The rotational movement of the frame 66 is restricted to 180 degrees in either direction when it stops in line with the belts and rollers 46 on either side of the vertical conveyor 12.

The rotation of the car 16 on a pallet 14 supported on the double-rectangular frame 66 is not dependent in any way on the movements of the vertical conveyor 12—whether it is stationary or traveling upward or downward.

When a driver enters the parking garage 10.4, his name and the number of his car 16 are registered electronically, as is the parking place where the pallet 14 bearing driver's car is parked.

A driver who has come to retrieve his car 16, registers his arrival by showing his entry card to a sensor. The moment when the computer identifies his car 16 as being on an outer pallet 14, the rectangular frame 66 commences rotating 180 degrees in either direction and stops with the car bearing pallet 14 on the rectangular frame 66 on an inner position, adjacent the vertical conveyor 12, ready to be moved sideways onto the vertical conveyor. This system will save every possible second as the moment the vertical conveyor stops the pallet 14 will be waiting to be moved.

Parking of cars 16 on all parking levels will be on the inner parking bays 18 until the inner parking bays are occupied by cars facing in the same direction—which is also the direction the cars faced when entering the entry/exit spaces 20, indicated by reference number 71 in FIG. 22. When all the inner parking bays 18 are occupied, one by one, or in any order, the rectangular twin pallet bearing frames 66 will rotate 180 degrees, the car 16 that occupied the inner bay will now be outside facing in the opposite direction and the next arriving cars will be parked on the newly available inner parking bays. When a driver claims his car 16, which is on an inner pallet 14, it will immediately be ready to slide on to the vertical conveyor 12. When a driver claims a car 16 which is on an outer pallet 14, the rectangular pallet bearing frame 66 will rotate 180 degrees and the car will now be on an inner pallet, facing in its original direction, ready to slide on to the vertical conveyor 12. All the cars leaving their parking levels will enter the vertical conveyor 12 and depart from the parking garage 10 facing the same direction The embodiments of the invention described and illustrated herein refer to storage structures in the form of parking garages 10 above ground, but the present invention also includes parking garages or other storage structures that extend below ground, with the levels below ground largely resembling the levels above ground.

It is advised that the entire operation should be computerized due to the speed at which the system will operate and especially during the first twenty minutes of retrieving vehicles. For very special cases where immediate emergency parking and retrieval is desired, for instance for the army or special police or fire control vehicles, a ten parking level with only inner parking would park and deliver 20 vehicles at great speed and would not even require a computer.

The invention claimed is:

1. A method of storing loads in a support structure that defines a plurality of bays that are spaced apart vertically on multiple levels, with equal vertical spacing between said levels, said method comprising:

receiving one of said loads on a support element;

sliding said loaded support element to a position in which the loaded support element is supported on a plurality of brackets, each of said brackets being connected to a continuous tensile element of a vertical conveyor and said brackets being spaced apart along said tensile element by a distance equal to the spacing between the levels of the support structure;

moving the loaded support element in the vertical conveyor along the tensile elements, to a predetermined level of the storage structure;

sliding the loaded support element from the vertical conveyor to an inner bay defined in the support structure, adjacent the vertical conveyor, said support structure defining a plurality of said inner bays in which support elements can be supported, and said inner bays being defined on opposing sides of the vertical conveyor, said support structure further defining an outer bay on at least one side of the vertical conveyor, on at least one of said levels, with an inner bay disposed between the outer bay and the vertical conveyor;

moving the loaded support element from the inner bay to an adjacent outer bay on the same level within the support structure;

retrieving the loaded support element by rotating a frame that is configured to support two of said support elements in the inner bay and outer bay, respectively, said rotation inverting the positions of the support elements between the inner bay and outer bay, to move the loaded support element from the outer bay to the inner bay, sliding the loaded support element from said inner bay to the vertical conveyor, supporting the loaded support element on brackets attached to the endless tensile elements of the vertical conveyor, moving the loaded support element in the vertical conveyor and sliding it from the vertical conveyor.

2. A method according to claim 1, which includes moving a plurality of said support elements in the vertical conveyor simultaneously, with the vertical spacing between the support elements equalling a number of the vertical spacing between levels of bays.

3. A method according to claim 1, wherein the support elements are pallets and the loads are vehicles that are received on the support elements and are retrieved from the support elements on an entrance/exit level.

4. A method according to claim 1, which includes moving brackets attached to an inactive side of each endless tensile element in an inverted state, while the support element is being moved in the vertical conveyor.

* * * * *